US006823101B2

(12) United States Patent
Gates, II et al.

(10) Patent No.: US 6,823,101 B2
(45) Date of Patent: Nov. 23, 2004

(54) METHOD FOR CALIBRATING A MEMS DEVICE

(75) Inventors: John V. Gates, II, New Providence, NJ (US); William R. Holland, Warrington, PA (US); Jungsang Kim, Basking Ridge, NJ (US); Stanley Pau, Hoboken, NJ (US)

(73) Assignees: Agere Systems Inc., Allentown, PA (US); Lucent Technologies Inc., Murray Hill, NJ (US)

( * ) Notice: Subject to any disclaimer, the term of this patent is extended or adjusted under 35 U.S.C. 154(b) by 381 days.

(21) Appl. No.: 10/046,352

(22) Filed: Jan. 14, 2002

(65) Prior Publication Data

US 2003/0133644 A1 Jul. 17, 2003

(51) Int. Cl.[7] ............................ G02B 6/35; G02B 26/08; H04B 10/08
(52) U.S. Cl. ............................ 385/19; 385/18; 385/52; 398/12; 398/19
(58) Field of Search ........................ 385/18–19, 16–24, 385/52; 356/140–141.5; 398/12, 19, 16

(56) References Cited

U.S. PATENT DOCUMENTS 6,411,751 B1 * 6/2002 Giles et al. .................. 385/16

* cited by examiner

*Primary Examiner*—Akm Enayet Ullah
*Assistant Examiner*—Jerry T. Rahll

(57) ABSTRACT

A method of calibrating a crossconnect including a MEMS device and another optical device, each of which further include a plurality of elements, the method including determining a relationship between an applied voltage and an angle response for a number of the elements of the MEMS device, determining a function of beam position and element position for the number of the elements of the MEMS device, assembling the MEMS device and the another optical device to produce the crossconnect, applying voltages to make sample connections between the MEMS device and the another optical device based on the relationship and the function, determining a transformation for the sample connections caused by packaging the crossconnect, and redetermining the relationship and the function based on the transformation. The method may be iterated more than once to achieve a more accurate determination.

21 Claims, 7 Drawing Sheets

FIG. 5

METHOD FOR CALIBRATING A MEMS DEVICE

TECHNICAL FIELD

The present invention relates to the field of fiber optic communications and in particular, to a method for calibrating a micro-electromechanical (MEMS) device.

BACKGROUND ART

In fiber optic communication systems, signal routing is the ability to direct a signal received from one of a plurality of input fibers or ports to any of a plurality of output fibers or ports without regard to the frequency and polarization of the optical signal. Signal routing is essential for directing an optical signal carrying data to an intended location.

Free-space optical crossconnects allow interconnecting among input and output ports in a reconfigurable switch fabric. An example of such an optical crossconnect utilizes an array of MEMS tilting mirror devices as the fabric. By adjusting the tilt angles of the MEMS mirror devices, optical signals can be directed to various destinations, i.e., to numerous output fibers.

Arrays of two-axis tilt mirrors implemented using micro-electromechanical systems (MEMS) technology allow for the construction of large scale optical crossconnects for use in optical systems. Optical crossconnects are commonly employed to connect a number of input optical paths to a number of output optical paths. A typical requirement of optical crossconnects is that any input be capable of being connected to any output. One example of a MEMS device is the MEMS mirror array 10 depicted in FIG. 1. The mirror array 10 includes a plurality of tilt mirrors 12 formed on a substrate 11, mounted to springs 14 and controlled by electrodes (not shown). Each mirror 12 is approximately 100–500 microns across, may be shaped as square circular or elliptical, and is gimbaled with the tilt angle being selectively determined by the amount of voltage applied to the control electrodes. Gimbaled mirrors are capable of operatively rotating or tilting about at least two axes, for example, orthogonal X-Y axes of rotation. With two axes, one axis is termed the mirror axis, the other axis (typically orthogonal to the mirror axis) is the gimbaled axis. Gimbaled mirror configurations are described in U.S. Pat. No. 6,201,631 to Greywall. Other mirrors, with only one axis, are also known in the art.

Further details of the operation of the MEMS mirror array 10 are found in copending U.S. patent application Ser. No. 09/415,178, filed Oct. 8, 1999. Utilizing two or more such tilt mirror arrays 10 to form an optical crossconnect is disclosed in copending U.S. patent application Ser. No. 09/410,586 filed Oct. 1, 1999. Techniques associated with monitoring mirror position are disclosed in copending U.S. patent application Ser. No. 09/414,621 filed Oct. 8, 1999. Techniques for detecting mirror position are disclosed in copending U.S. patent application Ser. No. 09/518,070 filed Mar. 3, 2000. The entire contents of each of the above-mentioned patent applications are hereby incorporated by reference.

The use of one or more MEMS tilt mirror arrays in conjunction with a lens array is disclosed in co-pending U.S. patent application Ser. No. 09/512,174, filed Feb. 24, 2000, the entire content of which is also incorporated herein by reference. As disclosed in that application, various optical crossconnect configurations of compact size (i.e. minimal spacing between crossconnect components) and exhibiting minimal optical power loss can be realized. One such optical crossconnect 100 discussed in the aforementioned application is depicted in FIG. 2. Crossconnect 100 receives input optic signals 108 through a plurality of optic fibers 112a, 112b, 112c, 112d, preferably formed in an array 112 as is well known in the art. For ease of illustration, fiber array 112 is shown as a one-dimensional array having four fibers 112a, 112b, 112c, 112d. It is in any event to be understood that fiber array 112, as well as other fiber arrays discussed herein are preferably two-dimensional arrays such as, for example, N×N arrays.

Fiber array 112 transmits the optical signals 108 to an array of lenses 114 that function as collimating lenses. The lens array 114 is positioned relative to fiber array 112 so that each lens communicates with a corresponding fiber for producing beams 116 from the optic signals 118. Thus, beam 116a is produced from a signal carried by fiber 112a, beam 116b is produced from a signal carried by fiber 112b, etc.

A first MEMS tilt mirror array 10a, also referred to as the input array, is positioned in alignment with the lens array 114 so that each mirror element 12a will receive a corresponding beam 116. The mirror elements 12a are operatively tilted, in a manner discussed in application Ser. No. 09/415,178, to reflect the respective beams 116 to a second or output MEMS mirror array 10b positioned in optical communication with MEMS array 10a. Depending on the tilt angle of each mirror element 12a in input MEMS array 10a, the reflected signals can be selectively directed to specific mirror elements 12b in output MEMS array 10b.

To illustrate this principle, beam 116a is shown in FIG. 2 generating reflection beams 120a and 120a' and beam 116d is shown generating reflection beams 120d and 120d'. The particular trajectory of the reflection beams is determined by the tilt angle of the mirrors in the MEMS array 10a, on which the beam 116 is incident. These beams are received by mirror elements 12b in the output MEMS array 10b and are directed as beams 124a to an output lens array 126. An output fiber array 128 is aligned with lens array 126 to receive and transmit output optical signals 129. Thus, lens array 126 couples beams 124 into the output fiber array 128.

MEMS devices 10a and 10b, and in particular, tilting mirror devices 12a and 12b, are fairly sensitive devices which may be moved by the application of a force and may require fairly precise positioning. Knowledge of the devices' 10a and 10b response to an applied force is important to controlling the position of the mirrors 12a and 12b. Further, acquiring this knowledge as quickly as possible is also an important criterion.

SUMMARY OF THE INVENTION

The present invention is directed to a method of calibrating a MEMS device such that the response of each of the elements of the MEMS device to the applied force is known.

The present invention is directed to a method of calibrating a MEMS device such that the MEMS device is calibrated quickly and accurately.

In the present invention, various voltages are applied via electrodes to create potentials between mirrors of the MEMS device and the electrodes to move the mirrors. The potentials cause the mirrors to rotate. The relationship between the applied voltage and the mirror rotation (in angle or position) is recorded as a calibration curve. In one embodiment, this relationship is determined for every mirror in the MEMS device. Next, the trajectory of a beam reflected by a mirror is determined as a function of mirror position. Determining the trajectory of the beam determines where the beam is directed by the mirror. In an optical cross-connect the beam is directed to a location on another component (e.g. another moving mirror in a different array, a non-moving optical element, an output fiber, etc.) In one embodiment, raytracing is used to determine where a beam will be directed as a function of mirror position. The angles of the mirrors associated with directing the beam to a particular location are determined from the ray tracing. In one embodiment, this relationship is determined for every mirror in the MEMS device. The calibration curve and the raytraces provide the voltages to be applied to move mirrors in a perfectly aligned cross-connect to direct a beam to desired locations.

Once this information is obtained, the optical interconnect is actually physically assembled. A subset of the mirrors are tested to determine the voltages that are actually needed to move the mirrors to direct the beams to the desired locations. The differences between the voltages actually required to make the connection (possibly after some minor adjustments) and the voltages provided based upon the calibration curve and the raytraces are determined. These differences represent a transformation that indicates the differences between a perfectly aligned crossconnect and a crossconnect as actually physically assembled.

The transformation may be more complicated than just a scalar, numerical value or values. The transformation may be a mathematical transformation, which relates the actual experimental voltages to calculated voltages of the perfectly aligned crossconnect, and may include a set of multivariable polynomials that describe the rotation, translation, tilt and distortion. With regard to the offset, once an initial and partial set of voltages are determined, the coefficients of the polynomial mapping are calculated and applied to calculate a new set of voltages. The transformation is used to update the values represented by the calibration curve and the raytraces. New actual measurements may then be taken and compared to the updated values represented by the calibration curve and the raytraces. The updated values and the actual measured values begin to converge, after, in a preferred embodiment, two to three times. In a preferred embodiment, a different number of mirrors are actually measured in each iteration. In a more preferred embodiment, more mirrors are actually measured in each subsequent iteration (each mirror being closer to actual in subsequent iterations). In a more preferred embodiment, four mirrors are used for the first iteration and 16 for a second.

One advantage of the method of the present invention is that every mirror need not be tested or trained after the crossconnect is assembled, thereby decreasing the time needed to calibrate the crossconnect.

BRIEF DESCRIPTION OF THE DRAWINGS

FIG. 5 illustrates angle vs. voltage data for a MEMS device 10 with 16×16 array of gimbaled mirrors, in one exemplary embodiment of the present invention.

DETAILED DESCRIPTION

The present invention is directed to a method of calibrating a MEMS device 10 such that the response of each of the elements 12 of the MEMS device 10 to the applied force is known. The present invention is described below in the context of a gimbaled configuration, but is also applicable to a one axis configuration.

Figure 3:
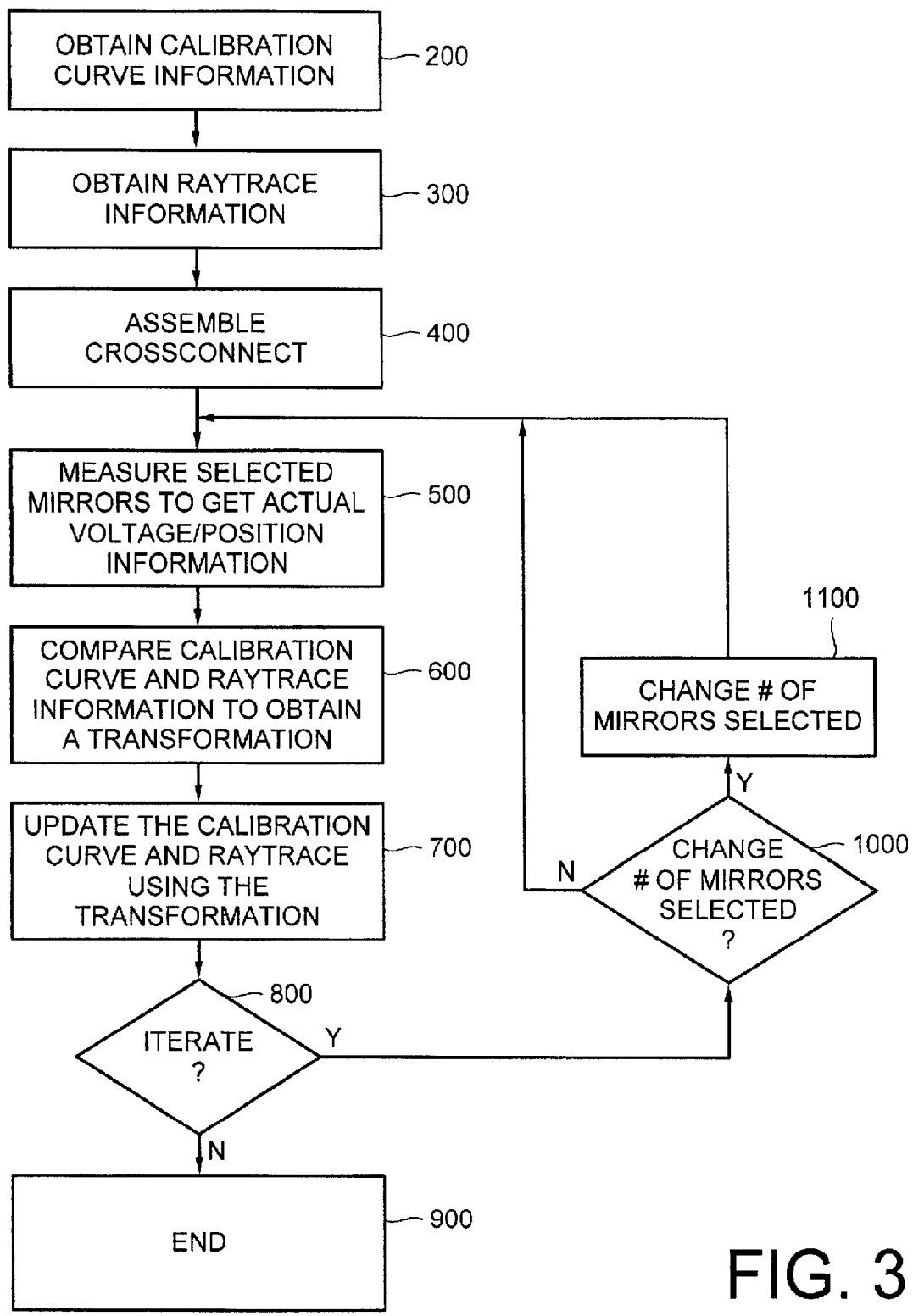
FIG. 3 illustrates a flowchart in one exemplary embodiment of the present invention.

FIG. 3 illustrates a flowchart in one exemplary embodiment of the present invention. Various voltages are applied via electrodes to create potentials between mirrors of the MEMS device and the electrodes to move the mirrors. The potentials cause the mirrors to rotate. The relationship between the applied voltage and the mirror rotation (in angle or position) is recorded as a calibration curve. Obtaining the calibration curve is step 200 of FIG. 3. In one embodiment, this relationship is determined for every mirror in the MEMS device. Next, the trajectory of a beam reflected by the beam to another location (i.e. another moving mirror in a different array, a non-moving optical element, an output fiber, etc.) is determined as a function of mirror position. In one embodiment, raytracing is used to determine where a beam will be directed as a function of mirror position. The angles of the mirrors associated with directing the beam to a particular location are determined from the raytracing. Obtaining the calibration curve is step 300 of FIG. 3. In one embodiment, this relationship is determined for every mirror in the MEMS device. The calibration curve and the raytraces provide the voltages to be applied to move mirrors in a perfectly aligned cross-connect to direct a beam to desired locations.

Once this information is obtained, the optical interconnect is actually physically assembled in step 400 of FIG. 3. A subset of the mirrors are tested to determine the voltages that are actually needed to move the mirrors to direct the beams to the desired locations in step 500 of FIG. 3. The differences between the voltages actually required to make the connection (possibly after some minor adjustments) and the voltages provided based upon the calibration curve and the raytraces are determined in step 600 of FIG. 3. These differences represent a transformation that indicates the differences between a perfectly aligned crossconnect and a crossconnect as actually physically assembled.

The transformation may be more complicated than just a scalar, numerical value or values. The transformation may be a mathematical transformation, which relates the actual experimental voltages to calculated voltages of the perfectly aligned crossconnect, and may include a set of multivariable polynomials that describe the rotation, translation, tilt and distortion. With regard to the offset, once an initial and partial set of voltages are determined, the coefficients of the polynomial mapping are calculated and applied to calculate a new set of voltages. The transformation is used to update the values represented by the calibration curve and the raytraces in step 700 of FIG. 3.

The process may then be iterated in step 800 or not in step 900. In steps 1000 and 1100 of FIG. 3, a different number of mirrors may be selected.

New actual measurements may then be taken and compared to the updated values represented by the calibration curve and the raytraces. The updated values and the actual measured values begin to converge, after, in a preferred embodiment, two to three times. In a preferred embodiment, a different number of mirrors are actually measured in each iteration. In a more preferred embodiment, more mirrors are actually measured in each subsequent iteration (each mirror being closer to actual in subsequent iterations). In a more preferred embodiment, four mirrors are used for the first iteration and 16 for a second.

More specifically, prior to assembly in an optical interconnect, the MEMS device 10 is tested to determine the relationship between the applied voltage and the angle response. As discussed above, in one embodiment, the elements 12 of the MEMS device 10 are mirrors, which are moved by electrostatic force between the mirrors and a proximate electrode. When a voltage is applied to the electrode, a potential difference between the mirror and the electrode is created, which causes the mirror to rotate in both an X and Y angle direction. Various, exemplary voltages are applied to the mirrors to record their angle direction rotation. Measurements are taken for various mirrors at various applied voltages and the rotation in the X and Y angle direction as well as the resulting beam position may be recorded.

Figure 4:
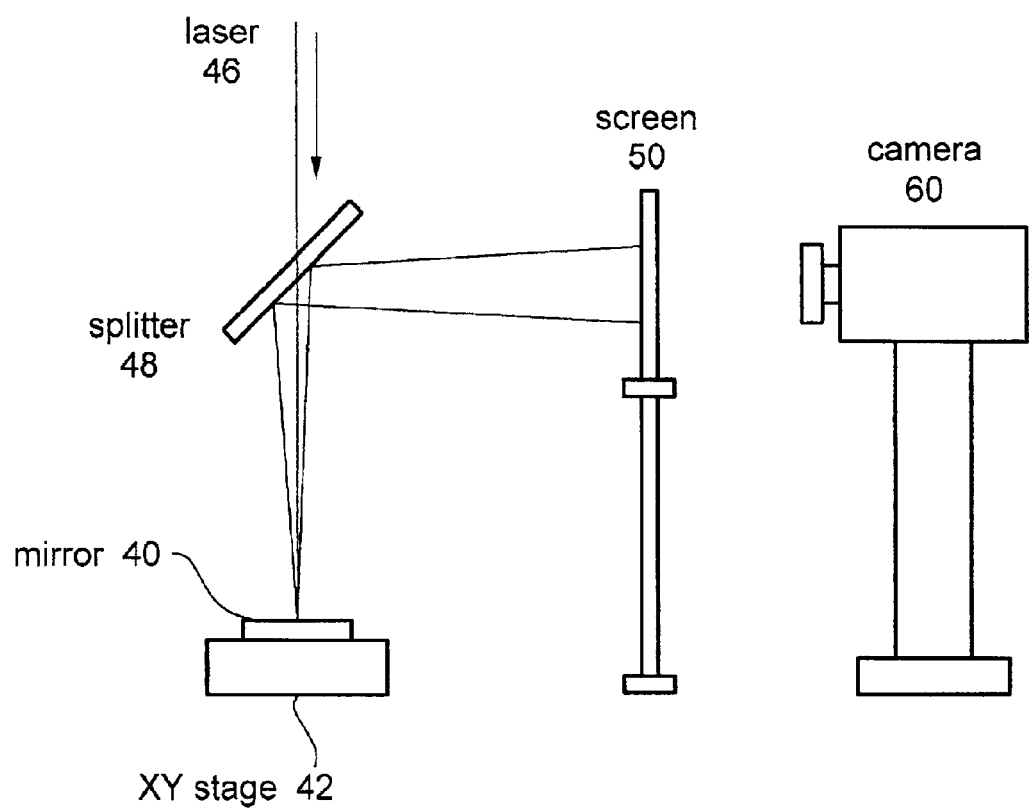
FIG. 4 illustrates an arrangement for collecting the voltage versus position or voltage versus angle information, in one exemplary embodiment of the present invention.

FIG. 4 illustrates an arrangement for collecting the voltage versus position or voltage versus angle information. A mirror 40 is placed on an X-Y stage 42 and X and Y voltages are applied. The mirror 40 moves and directs a beam from laser 46 to a screen 50 via splitter 48. The position of the beam on the screen 50 is measured by a camera 60. These measurements are taken for various voltages for various mirrors.

As described above, a finite set of data is measured. This finite set of data is fit to a mathematical function and the results are the coefficients of the mathematical function that describe the voltage versus angle (or voltage versus position) relationship for each MEMS mirror for an inclusive range of voltages. In a preferred embodiment, the mathematical functions is a polynomial. Process variations present during the manufacture of each mirror of the array may lead to different mirror properties and each individual mirror should be characterized at as many voltages as possible to obtain more accurate information. Mirrors that are not functional, either because of bad electrodes or other reasons, are marked and filtered out of the database.

For input and output arrays with a large number of mirrors, all input mirrors may not be able to access all output mirrors. Further, even if accessible, variations in electrode performance may be such that the array should be divided into smaller sections or subunits of mirrors for control purposes. In one preferred embodiment, a mirror array is divided in quadrants for control purposes.

Figure 5:
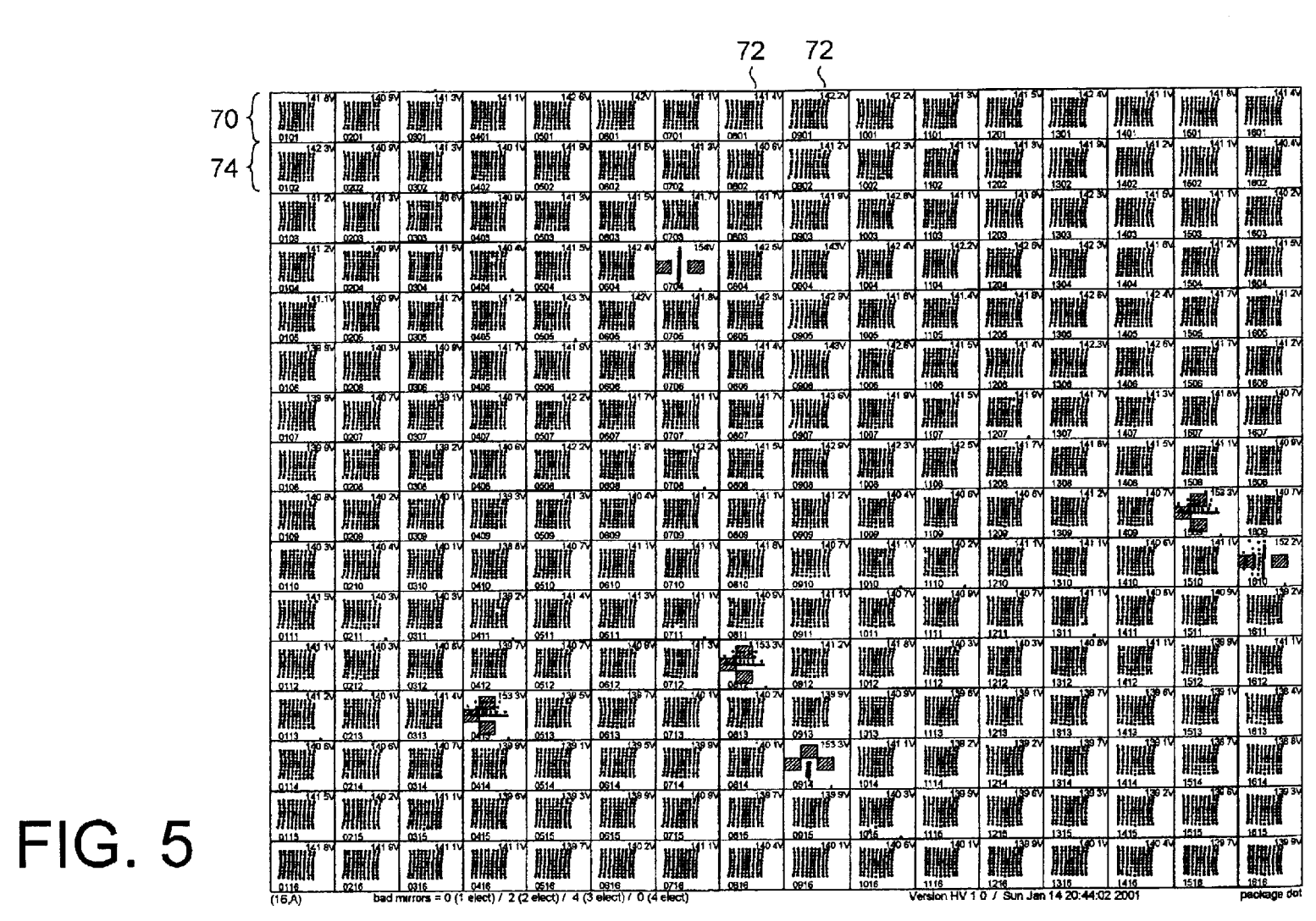

FIG. 5 illustrates angle vs. voltage data for an exemplary MEMS device 10 with 16×16 array of gimbaled mirrors. Each square 70 is a response (angle as a function of voltage) of each mirror. Scanning is performed to determine bad mirrors. The cross-hatching indicates a bad mirror 72 (there are seven bad mirrors 72 in FIG. 5). Scanning may be performed by applying a fixed voltage, from a lower limit (for example, 0 V) to an upper limit (for example, 160 V), in fixed increments (for example, 20 V).

The array of dots 74 in FIG. 5 indicates the response of the gimbaled mirror. As described above, the objective is to obtain a relationship between the voltages applied to the mirrors and the gimbal and the tilt of the mirrors along the two axes. It should be noted that the present invention is not limited to a gimbaled mirror configuration and is further applicable to modulator or a dynamic equalizer applications.

The measured data is fit to a mathematical function (in one example, a polynomial) to estimate how each mirror will react and where the beam will be positioned for voltages not actually measured. Due to the asymmetry of electrodes (and other phenomena), a single mathematical function or polynomial for all data may not be appropriate. In one exemplary embodiment, a different mathematical function or polynomial is used for each quadrant of the mirror array. The result(s) of the mathematical function or polynomial fit is a calibration curve.

Figure 1:
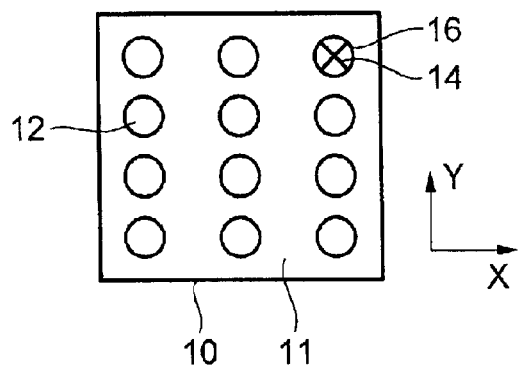
FIG. 1 illustrates a conventional MEMS mirror array.
Figure 2:
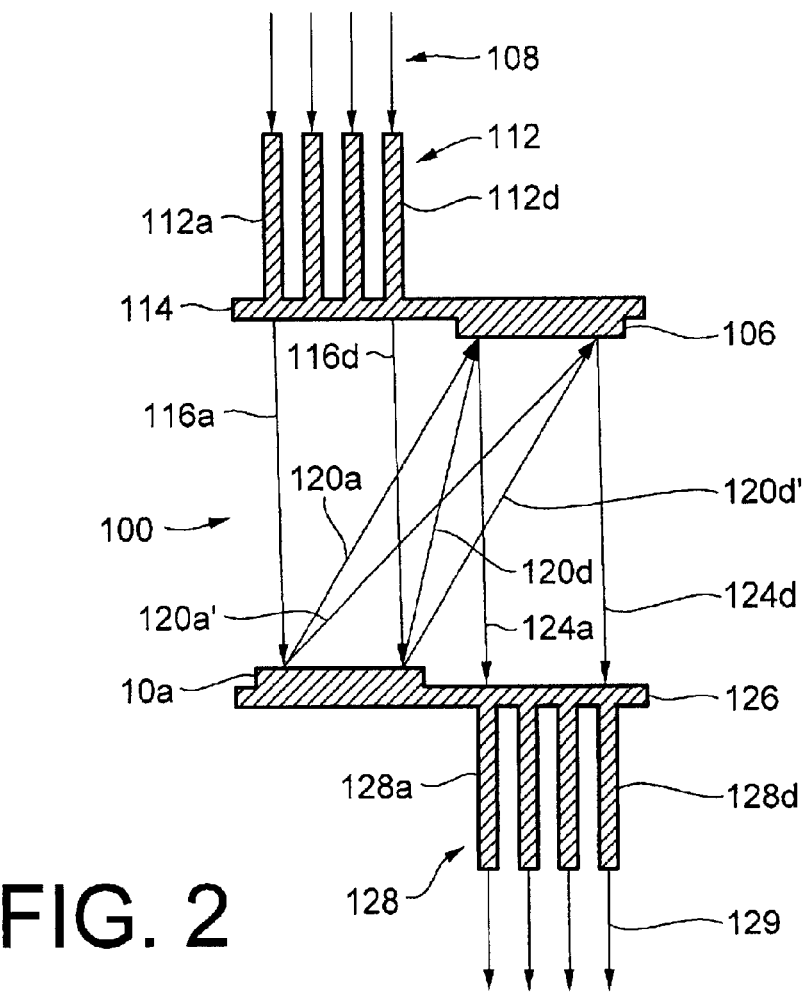
FIG. 2 illustrates a conventional optical crossconnect.

Once the calibration curve is obtained as described above, the next step is to determine the angle of a mirror necessary to direct a beam from the mirror (such as mirror 12a in FIG. 2) in a first array (such as MEMS devices 10a in FIG. 2) to a location (such as mirror 12b) in a second array (such as MEMS devices 10b). The location need not be mirror in a second array, but rather could be an output array of non-moving fibers or other location. The determination of how to direct a signal from a mirror in a first array to the location (a mirror in a second array) may be a simple geometric calculation, using the position of the mirror and the desired location of the beam. This may be accomplished by raytracing.

Figure 6:
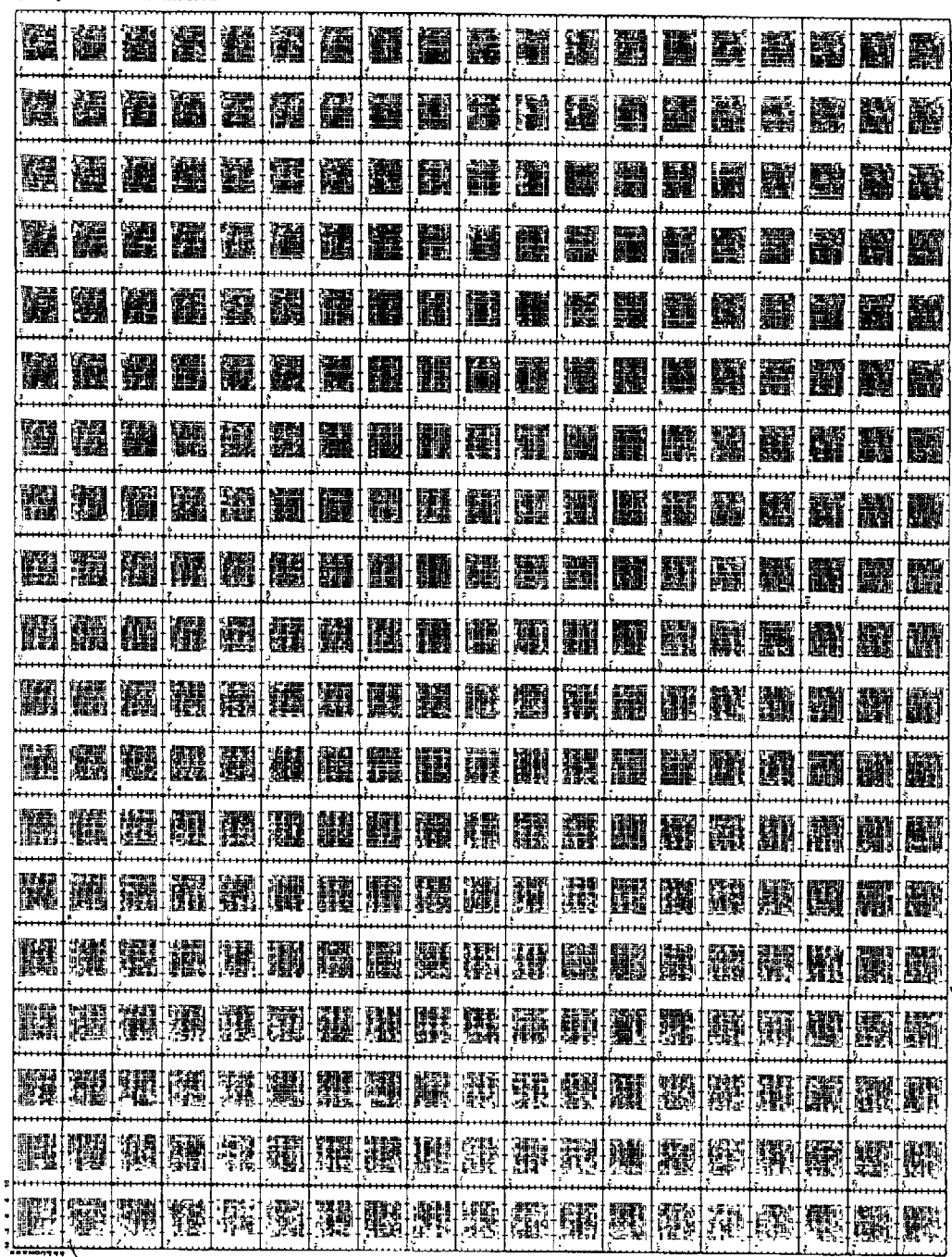
FIG. 6 illustrates the results of raytracing, in one exemplary embodiment of the present invention.

FIG. 6 illustrates exemplary results from a geometric model in a perfect environment with perfect alignment. Each square 80 represents a mirror 12a in MEMS devices 10a. The X axis is the angle of the mirror 12a on the first axis and the Y axis is the angle of the mirror 12a on the second axis. Each dot 82 represents the location of the beam at a location (for example, on the second array) as a function of the angle (or position) of the mirror in the MEMS device 10a. Conventional raytracing software called OSLO is available from Lambda Research Corp. of Littleton, Mass.

Figure 7:
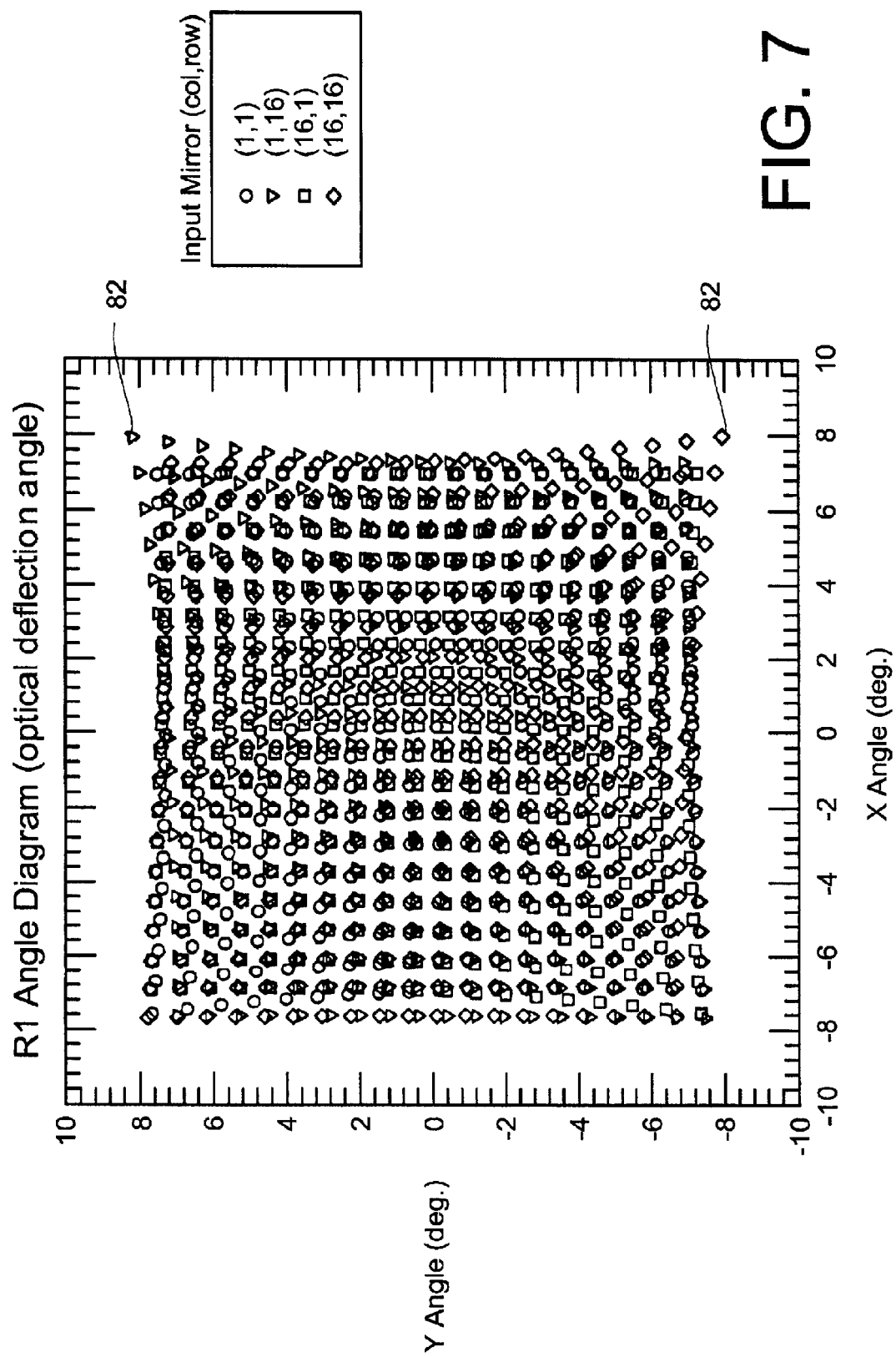
FIG. 7 illustrates the a portion of the results of FIG. 6 at better resolution.

At the resolution illustrated FIG. 6, all the dark squares 80 look somewhat similar. However, FIG. 7 illustrates the overlay of position data for four exemplary mirrors (1,1), (1,16), (16,1), and (16,16) from FIG. 6 at better resolution. As can be seen, the four mirror responses are not the same.

After the step of raytracing, the crossconnect 100 is assembled.

The next step is to make sample actual connections from sample mirrors in MEMS devices 10a to sample mirrors in MEMS devices 10b by applying the voltage indicated by the calibration curve at the angle indicated by the raytracing. Best results are obtained when corner mirror to corner mirrors are used as samples because these connections are the most demanding connections from a tilt angle perspective.

The next step is determining the transformation caused by assembling the crossconnect 100. This entails determining whether each of the expected connections was actually made and the strength of the received signal for each connection. It is likely that not all connections will be made and those that are made do not have the best signal strength. If the signal strength is not satisfactory, a transformation is determined to improve the signal strength.

The transformation may be more complicated than just scalar, numerical values. The transformation may relate the actual experimental voltages to calculated voltages of a perfectly aligned crossconnect, and may include a set of multivariable polynomials that describe the rotation, translation, tilt and distortion. With regard to the transformation, once an initial and partial set of voltages are determined, the coefficients of the polynomial mapping are calculated and applied to calculate a new set of voltages. This process may be iterated, and in a preferred embodiment, iterated two to three times. Further, the number of mirrors per iteration may also vary. In a preferred embodiment, the number of iterations in the first iteration is four and the number of iterations in the second iteration is sixteen.

Figure 8:
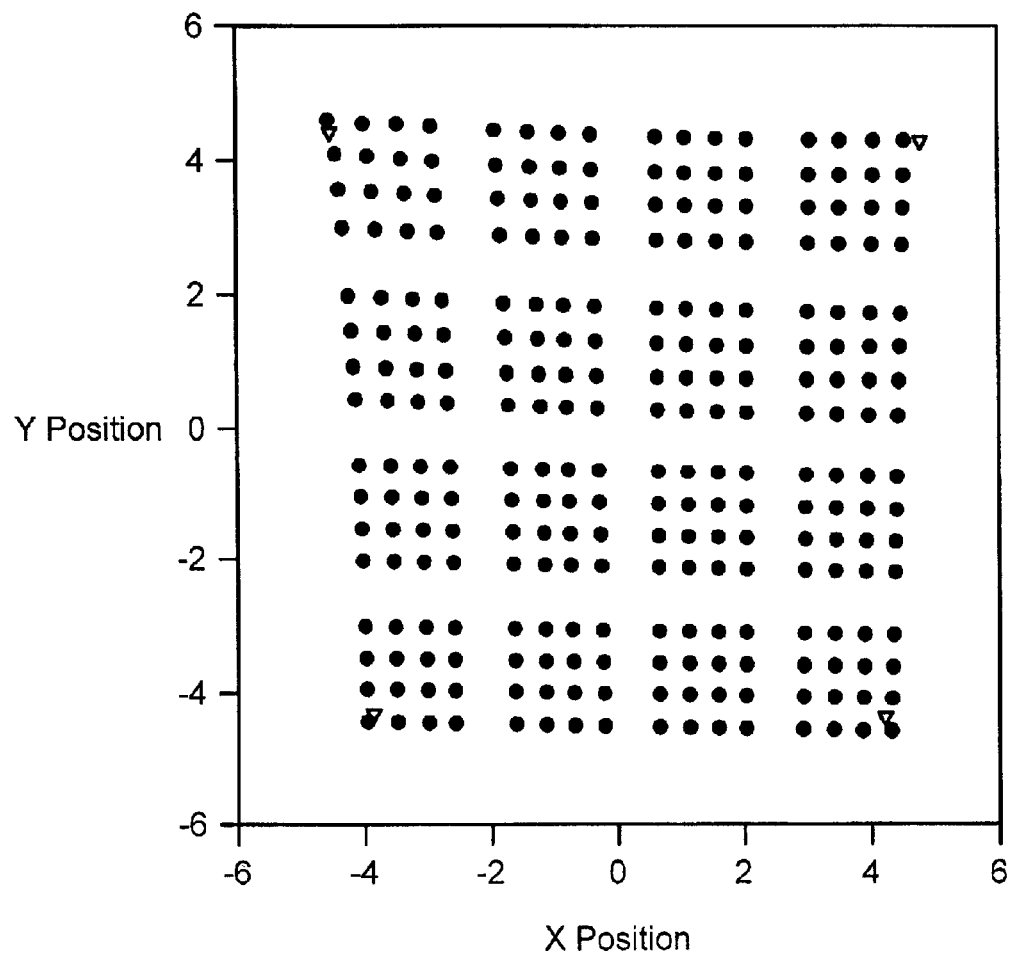
FIG. 8 illustrates calculated position coordinates for an input mirror to hit all output mirrors for a given crossconnect, in one exemplary embodiment of the present invention.

FIG. 8 illustrates the calculated position coordinates for input mirror (1,1) to hit all 256 output mirrors for a given crossconnect design and the 4 measured positions, calculated from the voltage fine training data. In FIG. 8, the circles represent the theoretical spot diagram and the triangles represent the partial fine training result.

The calibration curve is updated with the new voltage versus position point. The raytracing program is also updated with the new mirror angle (position) versus beam position point. The iterated and updated calibration curve and raytrace are then used for subsequent measurements.

For a crossconnect 100 with two MEMS devices 10*a*, 10*b*, the transformation determination should be reciprocal, that is the process of transformation determination should be performed for each MEMS devices 10*a*, 10*b*. For a two-device example, the transformation data for each array must be determined, and then the transformation for operating each device is used to determine the voltages actually required to tilt the mirrors to the desired angle.

As described above, the transformation determination in the exemplary embodiment begins with two sets of data, one for each MEMS device 10*a*, 10*b*. A mapping is determined from a subset of the mirrors (one or more, but not a prohibitive number) from MEMS devices 10*a* to all mirrors from MEMS devices 10*b* and from a subset of the mirrors (one or more, but not a prohibitive number) from MEMS devices 10*b* to all mirrors from MEMS devices 10*a*. Then, an interpolation algorithm, such as a least squares fit algorithm, is applied to the two sets of transformation data to determine dx and dy offsets, a rotation offset, dθ, and a magnification m (collectively the "transformation").

The next step is to reapply the transformation determination to the predictive calibration curve and/or the raytrace in order to obtain more accurate calibration curve and/or the raytrace information.

The present invention may be illustrated by the following example.

EXAMPLE

This example assumes two axes of rotation. The calibration curve of voltage versus position (along one axis) for each mirror is represented by:

$$X(V_{12},V_{34})=c_0+c_1V_{12}+c_2V_{34}+c_3V_{12}V_{34}+c_4V_{12}^2+c_5V_{34}^2+c_6V_{12}V_{34}^2+c_7V_{12}^2V_{34}+c_8V_{12}^3+c_9V_{34}^3 \quad [1]$$

where $$V_{12}=V_1-V_2$$

$$V_{34}=V_3-V_4 \quad [2]$$

$X(V_{12}, V_{34})$=coordinates of ray for a pair of input and output mirrors $c_n$=polynomial coefficients.

The polynomial of Eq. (1) should be chosen to map the response curve of voltage versus position.

A similar formula can be written for a second axis. Data, as illustrated in FIG. 5, for each mirror 12*a*, 12*b* is measured in position space and then centered. The center is defined to be the position where $(V_{12}, V_{34})=(0,0)$. In this example, there are 169 data points. After the scan data is offset by the center pixel values, the data is divided into four overlapping quadrant sets of 49 data points, representing the regions:

$$(x>0,y\geq 0),(x\geq 0,y\leq 0),(x\leq 0,y\geq 0),(x\leq 0,y\leq 0) \quad [3]$$

Each set of data points is converted into a 10 coefficient by 49 data point matrix. The coefficients c are calculated in Eq. (1) using singular value decomposition (SVD). In this way, an average deviation of less than 2 pixel units are obtained between the calculated and measured results using the polynomial relations. The above formulae provide a way to quickly calculate position from voltages. An inverse relation is used for the modeling to calculate voltages from position space. This is done using Newton method of root finding for the relation, $$X(V_{12},V_{34})-X_0=0 \quad [4]$$

The scanning range of the voltages and positions should be wide enough to accommodate an actual design of the optical crossconnect.

Then, prediction data is calculated. Using a raytracing program, such as XEMAX or OSLO, or by geometric arguments, the position coordinates of the output mirror 12*b* can be modeled relative to the input mirror 12*a*, for each possible connection. The set of coordinates for each connection is calculated assuming zero offset, tilt and rotation between the MEMS devices 10*a*, 10*b* and any intervening optics. Using the relationship determined above, the voltages to make all the connections for all the mirrors 10*a*, 10*b* can be calculated. This first calculation gives a rough estimate of the voltages and should be refined when measurements are available. The first estimated voltages are used to make a subset of connections, such as a 4 by 4 subset, or 16 connections. The results from fine training are then used to calculate the transformation, which can be used to give a more accurate set of prediction voltages.

From the measured 16 connections, the voltages are converted back to position space using the fit polynomial for the 4 input 12*a* and output 12*b* mirrors. As discussed above, FIG. 8 illustrates the calculated position coordinates for input mirror (1,1) to hit all 256 output mirrors for a given crossconnect design and the 4 measured positions, calculated from the voltage fine training data.

The real data coordinates (triangles) are related to the theoretical coordinates (circles) by the following relationship.

$$\begin{bmatrix} 1 & x_1 & y_1 \\ 1 & x_2 & y_2 \\ 1 & x_3 & y_3 \\ 1 & x_4 & y_4 \end{bmatrix} \begin{bmatrix} a_x \\ b_x \\ c_x \end{bmatrix} = \begin{bmatrix} X_1 \\ X_2 \\ X_3 \\ X_4 \end{bmatrix},$$

$$\begin{bmatrix} 1 & x_1 & y_1 \\ 1 & x_2 & y_2 \\ 1 & x_3 & y_3 \\ 1 & x_4 & y_4 \end{bmatrix} \begin{bmatrix} a_y \\ b_y \\ c_y \end{bmatrix} = \begin{bmatrix} Y_1 \\ Y_2 \\ Y_3 \\ Y_4 \end{bmatrix}, \quad [5]$$

where (x,y) are measured values and (X,Y) are calculated values. The coefficients a, b, c are mirror dependent and have the form, $$a_{x,y}(r_{in},c_{in})=A_a+B_a r_{in}+C_a c_{in}+D_a r_{in}c_{in}+E_a r_{in}^2+F_a c_{in}^2,$$

$$b_{x,y}(r_{in},c_{in})=A_b+B_b r_{in}+C_b c_{in}+D_b r_{in}c_{in}+E_b r_{in}^2+F_b c_{in}^2,$$

$$c_{x,y}(r_{in},c_{in})=A_c+B_c r_{in}+C_c c_{in}+D_c r_{in}c_{in}+E_c r_{in}^2+F_c c_{in}^2, \quad [6]$$

where $r_{in}$ and $c_{in}$ are rows and columns position of the input mirror 12*a*. A similar relationship is used for the output mirrors 12b. For the first four data points, because there are more unknowns than data points, only the values A, B, C can be calculated. When more data points are available, D, E and F can be calculated. Using SVD, the coefficients a, b, c are determined for the set of input and output mirrors 12a, 12b. Then, using the coefficients for the mirrors 12a, 12b, the global coefficients A, B, C etc. can then be calculated. Once the global coefficients are calculated, the new coordinates (x,y) for all possible input and output mirrors 12a, 12b are recalculated using the updated coefficients. The new coordinates are converted to voltage space and then begins to train the next 8×8 subsets of connections.

It is noted that the subsets should be well sampled and spread out. After the 8×8 connections are finished, new global coefficients and prediction values are calculated. For the next iteration, a 16×16 subset is trained and recalculated. In practice, after a 16×16 iteration, the predicted voltages should be very close to the actual voltages, such that a finite signal is obtained when the predicted voltage is applied.

After the first 4×4 measurement, the relationship between (x,y) and (X,Y) should be made nonlinear. This may be accomplished by adding quadratic terms such as $$\begin{bmatrix} 1 & x_1 & y_1 & x_1 y_1 & x_1^2 & y_1^2 \\ \vdots & & & & & \vdots \\ 1 & x_N & y & x_N y_N & x_N^2 & y_N^2 \end{bmatrix} \begin{bmatrix} a_x \\ b_x \\ c_x \\ d_x \\ e_x \\ f_x \end{bmatrix} = \begin{bmatrix} X_1 \\ \vdots \\ X_N \end{bmatrix}, \quad [7]$$

and the corresponding global coefficients.

$$d_{x,y}(r_{in},c_{in}) = A_d + B_d r_{in} + C_d c_{in} + D_d r_{in} c_{in} + E_d r_{in}^2 + F_d c_{in}^2,$$

$$e_{x,y}(r_{in},c_{in}) = A_e + B_e r_{in} + C_e c_{in} + D_e r_{in} c_{in} + E_e r_{in}^2 + F_e c_{in}^2,$$

$$f_{x,y}(r_{in},c_{in}) = A_f + B_f r_{in} + C_f c_{in} + D_f r_{in} c_{in} + E_f r_{in}^2 + F_f c_{in}^2, \quad [8]$$

For a large database of connections, the database should be checked. One technique of doing a self-consistent check is to look at the loss of each connection. In general, there are $N^2$ connections for an N port switch. There are further N loss values, which can be decomposed into input port loss and output port loss.

$$L_{total} = L_{input} + L_{output} \quad [9]$$

The average input/output port loss can be calculated directly from the database by inverting a $2N \times N^2$ matrix. For example, in case where N=2, $$\begin{bmatrix} 1 & 0 & 1 & 0 \\ 1 & 0 & 0 & 1 \\ 0 & 1 & 1 & 0 \\ 0 & 1 & 0 & 1 \end{bmatrix} \begin{bmatrix} \overline{L_{input,1}} \\ \overline{L_{input,2}} \\ \overline{L_{output,1}} \\ \overline{L_{output,2}} \end{bmatrix} = \begin{bmatrix} L_{total,1,1} \\ L_{total,1,2} \\ L_{total,2,1} \\ L_{total,2,2} \end{bmatrix} \quad [10]$$

Inverting the matrix using SVD gives the average loss for each input and output. The database may then be verified by calculating the deviation of the average losses from the measured loss.

$$\frac{\Delta L}{\overline{L_{input}} + \overline{L_{output}}} = \frac{L_{total} - (\overline{L_{input}} + \overline{L_{output}})}{\overline{L_{input}} + \overline{L_{output}}}, \quad [11]$$

If the ratio is too large, for example greater than 10%, then there is a discrepancy and the connection should be retrained and/or examined (i.e. to clean the fiber and/or detector).

An advantage of the method of the present invention is that every mirror need not be tested or trained after the crossconnect 100 is assembled. This can reduce the time needed to align the crossconnect from days to hours.

It is noted that, in order to be most effective, the transformation should be determined from the mirrors or other elements that must tilt through the broadest range of angles (normally the corner elements, or the elements closest to the corners that work) are the elements that must tilt the most to make the desired connections.

It should be noted that the present invention is not limited to a gimbaled mirror configuration and is further applicable to modulator or a dynamic equalizer applications and a one axis configuration.

It is further contemplated that the manufacturer of the MEMS devices 10a, 10b may perform the calibration and raytracing step and a user of the assembled device may determine the transformation. Such a task division is contemplated as being within the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claim is:

1. A method of calibrating a crossconnect including a MEMS device and another optical device, each of which further include a plurality of elements, said method comprising:
    (a) determining a relationship between an applied voltage and an angle response for a number of the elements of the MEMS device;
    (b) determining a function of beam position and element position for the number of the elements of the MEMS device;
    (c) assembling the MEMS device and the another optical device to produce the crossconnect;
    (d) applying voltages to make sample connections between the MEMS device and the another optical device based on the relationship and the function;
    (e) determining a transformation for the sample connections caused by packaging the crossconnect; and
    (f) redetermining the relationship and the function based on the transformation.

2. The method of calibrating a crossconnect of claim 1, wherein said step of determining a relationship between the applied voltage and the angle response includes a combination of measuring values and estimating values.

3. The method of calibrating a crossconnect of claim 2, wherein the estimated values are estimated using one of mathematical function fitting and interpolation.

4. The method of calibrating a crossconnect of claim 1, further comprising:
    determining the destination of a beam signal as a function of mirror position by performing raytracing.

5. The method of calibrating a crossconnect of claim 1, wherein the sample connections are made for corner elements.

6. The method of calibrating a crossconnect of claim 1, wherein the transformation includes at least one of an x and y offset, a rotation offset, and a magnification.

7. The method of calibrating a crossconnect of claim 1, wherein at least one of the MEMS device and the another optical device are one of gimbaled mirror arrangements, non-moving elements, and optical fibers.

8. The method of calibrating a crossconnect of claim 1, further comprising iterating steps (a)–(f).

9. A crossconnect including a MEMS device and another optical device calibrated by the method of claim 1.

10. A method of preparing a MEMS device and another optical device for calibration as a crossconnect, the MEMS device and the another optical device each including a plurality of elements, said method comprising:

(a) determining a relationship between an applied voltage and an angle response for a number of the elements of the MEMS device; and (b) determining a function of beam position and element position for the number of the elements of the MEMS device, wherein said step of determining a relationship between the applied voltage and the angle response includes a combination of measuring values and estimating values.

11. The method of calibrating a crossconnect of claim 10, wherein the estimated values are estimated using one of mathematical function fitting and interpolation.

12. The method of calibrating a crossconnect of claim 10, further comprising:

determining the destination of a beam signal as a function of mirror position by performing raytracing.

13. The method of calibrating a crossconnect of claim 10, further comprising:

determining a transformation for sample connections between the MEMS device and another optical device caused by packaging the crossconnect, wherein the transformation includes at least one of an x and y offset, a rotation offset, and a magnification.

14. The method of calibrating a crossconnect of claim 10, wherein at least one of the MEMS device and the another optical device are one of gimbaled mirror arrangements, non-moving elements, and optical fibers.

15. A method of calibrating a crossconnect including a MEMS device and another optical device, each of which further including a plurality of elements, said method comprising:

(a) applying voltages to make sample connections between the MEMS device and the another optical device based on a relationship between an applied voltage and an angle response for a number of the elements of the MEMS device and a function of beam position and element position for the number of the elements of the MEMS device;

(b) determining a transformation for the sample connections caused by packaging the crossconnect; and (c) redetermining the relationship and the function based on the transformation.

16. The method of calibrating a crossconnect of claim 15, further comprising iterating steps (a)–(c).

17. The method of calibrating a crossconnect of claim 15, wherein the relationship between the applied voltage and the angle response includes a combination of measuring values and estimating values.

18. The method of calibrating a crossconnect of claim 17, wherein the estimated values are estimated using one of mathematical function fitting and interpolation.

19. The method of calibrating a crossconnect of claim 15, wherein the function of beam position and element position for the number of the elements of mirror position is obtained by raytracing.

20. The method of calibrating a crossconnect of claim 15, wherein the transformation includes at least one of an x and y offset, a rotation offset, and a magnification.

21. The method of calibrating a crossconnect of claim 15, wherein at least one of the MEMS device and the another optical device are one of gimbaled mirror arrangements, non-moving elements, and optical fibers.

* * * * *